United States Patent
Tahmasbi-Sarvestani et al.

(10) Patent No.: US 11,565,693 B2
(45) Date of Patent: Jan. 31, 2023

(54) SYSTEMS AND METHODS FOR DISTRACTED DRIVING DETECTION

(71) Applicants: Honda Motor Co., Ltd., Tokyo (JP); The Regents of the University of Michigan, Ann Arbor, MI (US)

(72) Inventors: Amin Tahmasbi-Sarvestani, Farmington Hills, MI (US); Shan Bao, Ann Arbor, MI (US); Fred Feng, Ann Arbor, MI (US); Judy Jin, Ann Arbor, MI (US); Wenbo Sun, Ann Arbor, MI (US)

(73) Assignees: Honda Motor Co., Ltd., Tokyo (JP); The Regents of the University of Michigan, Anh Arbor, MI (US)

( * ) Notice: Subject to any disclaimer, the term of this patent is extended or adjusted under 35 U.S.C. 154(b) by 222 days.

(21) Appl. No.: 16/297,212

(22) Filed: Mar. 8, 2019

(65) Prior Publication Data
US 2019/0337512 A1 Nov. 7, 2019

Related U.S. Application Data

(60) Provisional application No. 62/666,684, filed on May 3, 2018.

(51) Int. Cl.
| | |
|---|---|
| *B60W 30/095* | (2012.01) |
| *B60W 40/09* | (2012.01) |
| *G08G 1/16* | (2006.01) |
| *G06V 20/59* | (2022.01) |
| *B60W 40/08* | (2012.01) |

(52) U.S. Cl.
CPC ........ *B60W 30/0956* (2013.01); *B60W 40/09* (2013.01); *G06V 20/597* (2022.01); *G08G 1/167* (2013.01); *B60W 2040/0818* (2013.01)

(58) Field of Classification Search
CPC ............ B60W 30/0956; B60W 40/09; B60W 2040/0818; G06K 9/00845; G08G 1/167
See application file for complete search history.

(56) References Cited

U.S. PATENT DOCUMENTS

| | | | |
|---|---|---|---|
| 7,084,772 | B2 | 8/2006 | Oyama |
| 7,509,211 | B2 | 3/2009 | Niwa et al. |
| 7,542,840 | B2 | 6/2009 | Kawakami et al. |
| 7,719,431 | B2 | 5/2010 | Bolourchi |
| 8,098,895 | B2 | 1/2012 | Kageyama et al. |
| 8,519,853 | B2 | 8/2013 | Eskandarian et al. |
| 9,122,933 | B2 | 9/2015 | Palan |

(Continued)

*Primary Examiner* — Mahmoud S Ismail
*Assistant Examiner* — Gabriel Anfinrud
(74) *Attorney, Agent, or Firm* — Rankin, Hill & Clark LLP

(57) ABSTRACT

Systems and methods for distracted driving detection are described. A method includes receiving proximate vehicle data about a proximate vehicle proximate to the host vehicle. The method also includes estimating one or more baselines for a predetermined future time for the proximate vehicle from the proximate vehicle data. The method further includes comparing current kinematic data of the proximate vehicle data for the predetermined future time to the one or more baselines. The method includes generating distraction flags associated with the proximate vehicle based on the comparison. The method also includes controlling one or more vehicle systems of the host vehicle based on the generated distraction flags.

17 Claims, 7 Drawing Sheets

(56) References Cited

U.S. PATENT DOCUMENTS

| | | | |
|---|---|---|---|
| 9,804,599 B2* | 10/2017 | Kentley-Klay | G08G 1/202 |
| 2009/0091435 A1* | 4/2009 | Bolourchi | B60K 28/066 |
| | | | 340/435 |
| 2009/0096597 A1 | 4/2009 | Avery, Jr. et al. | |
| 2013/0151058 A1 | 6/2013 | Zagorski et al. | |
| 2015/0138361 A1 | 5/2015 | Tatsukawa | |
| 2015/0160653 A1* | 6/2015 | Cheatham, III | B60W 30/0956 |
| | | | 701/23 |
| 2017/0036673 A1 | 2/2017 | Lee | |
| 2018/0046867 A1 | 2/2018 | Yang | |
| 2018/0126901 A1* | 5/2018 | Levkova | G06K 9/00597 |
| 2018/0144636 A1* | 5/2018 | Becker | B60W 30/0956 |
| 2019/0332106 A1* | 10/2019 | Belloni Mourao | B60K 28/06 |
| 2020/0257301 A1* | 8/2020 | Weiser | G06N 3/02 |

* cited by examiner

SYSTEMS AND METHODS FOR DISTRACTED DRIVING DETECTION

BACKGROUND

Safe driving requires drivers' continuous attention on the roadways. Any activities and/or distractions that compete for the driver's attention while driving have the potential to degrade driving performance and can lead to serious consequences for driving safety. The activities and/or distractions may include visual distractions (e.g., looking at a portable device or a vehicle occupant in the back seat), auditory distractions (e.g., participating in a conversation with other vehicle occupants), manual distractions (e.g., physically manipulating an object), cognitive distractions (e.g., thoughts that absorb the attention of a driver, or hybrid distractions (e.g., texting on a portable device may be a visual distraction, manual distraction, and a cognitive distraction). However, because other drivers cannot see whether another driver is a distracted, it is difficult for the other drivers to identify a distracted driver. The problem of distracted driving is further exacerbated if the drivers do not recognize a distracted driver or are distracted themselves.

BRIEF DESCRIPTION

According to one aspect, a method for distracted driving detection includes receiving proximate vehicle data about a proximate vehicle proximate to a host vehicle. The method also includes estimating one or more baselines for a predetermined future time for the proximate vehicle from the proximate vehicle data. The method further includes comparing current kinematic data of the proximate vehicle data for the predetermined future time to the one or more baselines. The method includes generating distraction flags associated with the proximate vehicle based on the comparison. The method also includes controlling one or more vehicle systems of the host vehicle based on the generated distraction flags.

According to another aspect, a distraction detection system for distracted driving detection includes a data receiving module, an estimation module, a determination module, and a control module. The data receiving module receives proximate vehicle data about a proximate vehicle proximate to a host vehicle. The estimation module estimates one or more baselines for a predetermined future time for the proximate vehicle from the proximate vehicle data. The determination module generates distraction flags for the proximate vehicle based on current kinematic data about the proximate vehicle at the predetermined future time and the one or more baselines. The control module controls one or more vehicle systems of the host vehicle based on the identified distraction flags.

According to a further aspect, a non-transitory computer-readable storage medium storing instructions that, when executed by a computer, causes the computer to perform a method is provided. The method includes receiving proximate vehicle data about a proximate vehicle proximate to a host vehicle. The method also includes estimating a Lane Offset Value (LOV) baseline that predicts a path of the proximate vehicle in a lane and estimating a Lane Offset Error (LOE) baseline that predicts variance in predicted behavior of the proximate vehicle. The method further includes comparing current kinematic data about the proximate vehicle to the LOV baseline and the LOE baseline. The method includes generating distraction flags associated with the proximate vehicle based on the comparison. The method further includes calculating a distraction probability based on the generated distraction flags. The method also includes controlling one or more vehicle systems of the host vehicle based on the distraction probability.

DETAILED DESCRIPTION

Figure 1:
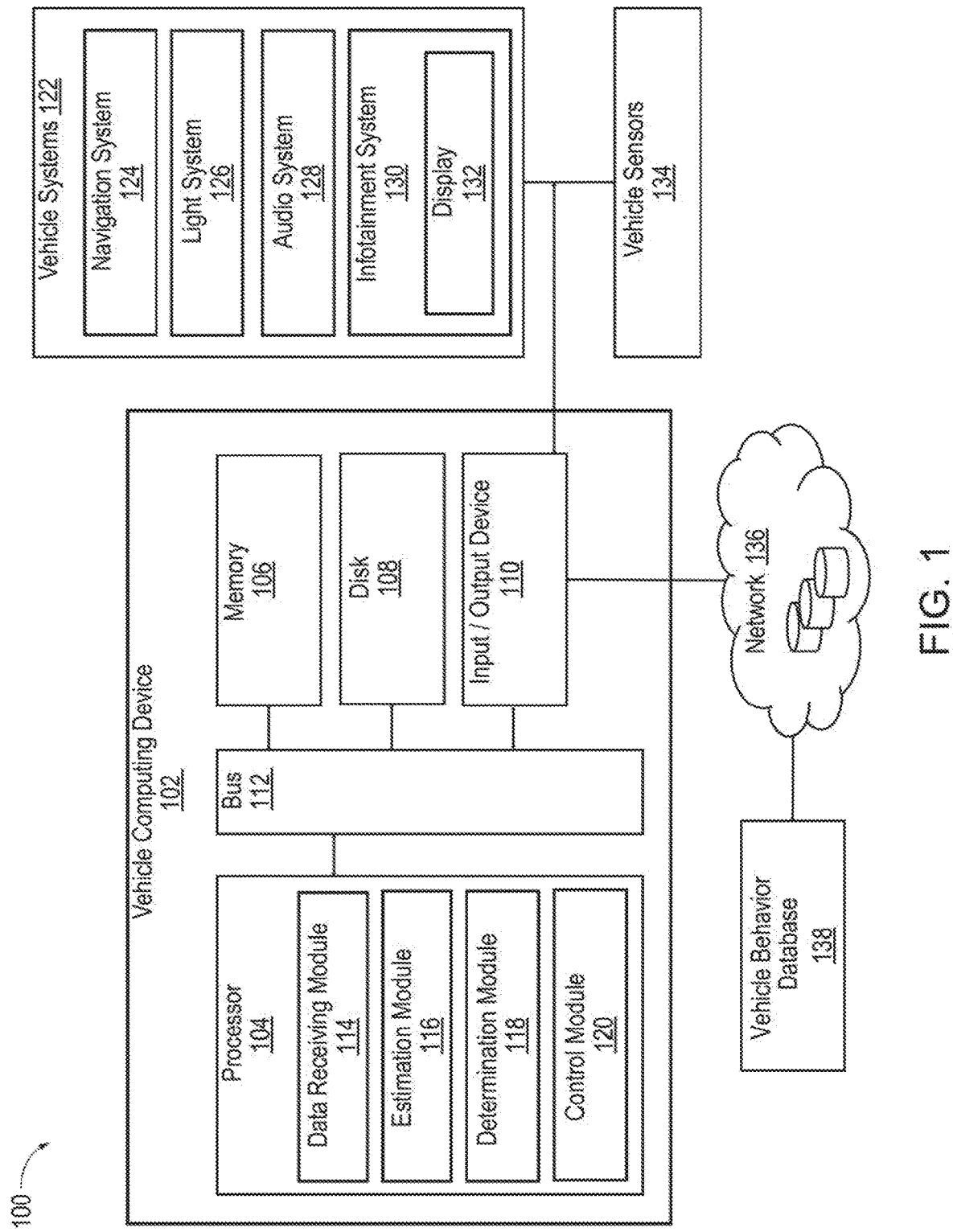
FIG. 1 is a schematic diagram of an operating environment for implementing systems and methods for distracted driving detection according to an exemplary embodiment.

Generally, the systems and methods disclosed herein are directed to detecting an occurrence of distracted driving by a proximate vehicle being driven in the environment of a host vehicle. The vehicle sensors of the host vehicle measure proximate vehicle data regarding the proximate vehicle. The future behavior of the proximate vehicle can be estimated using the proximate vehicle data. In this manner, a baseline corresponding to expected attentive behavior can be predicted for the proximate vehicle. For example, the proximate vehicle data may include the distance of the proximate vehicle from lane lines and from the host vehicle, the proximate vehicle's orientation, the lateral and longitudinal speed of the proximate vehicle, and the lateral and longitudinal acceleration of the proximate vehicle, among others. The actual behavior of the proximate vehicle is monitored to determine whether the proximate vehicle is behaving in a manner similar to the estimated behavior.

Later, current kinematic data corresponding to the proximate vehicle can be compared to the baseline to determine if the proximate vehicle is exhibiting attentive driving behavior. However, if the current kinematic data significantly deviates from the baseline, the proximate vehicle is no longer exhibiting normal driving behavior, which may indicate that the driver of the proximate vehicle has become distracted. The deviation from the baseline may be deemed significant based on the number of times and the degree to which the proximate vehicle deviates from the baseline.

One or more vehicle systems may be controlled to accommodate the driving style of the proximate vehicle, whether the behavior of the proximate vehicle is normal or distracted. For example, if it is determined that the driver of the proximate vehicle may be distracted, in one embodiment, an autonomous cruise control system or lane keep assist system of the vehicle may be enabled. In another embodiment, a slight automatic brake may be applied to the host vehicle to increase the distance between the host vehicle and the proximate vehicle. An audible or visual warning may also be provided to the driver of the host vehicle to inform the driver of the distracted driving of the proximate vehicle and/or inform of the driver of the action to taken to accommodate the driving style of the proximate vehicle. Accordingly, the systems and methods described herein aid the driver of the host vehicle in recognizing distracted driving behavior, and may change the operation of the host vehicle to accommodate the distracted driving behavior of the proximate vehicle.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which a vehicle is travelling or is projected to travel along.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Referring now to the drawings, wherein the showings are for purposes of illustrating one or more exemplary embodiments and not for purposes of limiting same, FIG. 1 is a schematic diagram of an operating environment 100 for distracted driving detection. The components of operating environment 100, as well as the components of other systems, hardware architectures, and software architectures discussed herein, can be combined, omitted, or organized into different architectures for various embodiments. Further, the components of the operating environment 100 can be implemented with or associated with a host vehicle.

In the illustrated embodiment of FIG. 1, the operating environment 100 includes a vehicle computing device (VCD) 102 with provisions for processing, communicating and interacting with various components of a vehicle and other components of the operating environment 100. In one embodiment, the VCD 102 can be implemented with a host vehicle 202 (shown in FIG. 2), for example, as part of a telematics unit, a head unit, a navigation unit, an infotainment unit, an electronic control unit, among others. In other embodiments, the components and functions of the VCD 102 can be implemented remotely from the host vehicle 202, for example, with a portable device (not shown) or another device connected via a network (e.g., a network 136).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes a data receiving module 114, an estimation module 116, a determination module 118, and a control module 120, for assisting the host vehicle 202 in detecting distracted driving behavior, facilitated by the components of the operating environment 100.

The VCD 102 is also operably connected for computer communication (e.g., via the bus 112 and/or the I/O interface 110) to one or more vehicle systems 122. The vehicle systems 122 can include, but are not limited to, any automatic or manual systems that can be used to enhance the vehicle, driving, and/or safety. Here, the vehicle systems 122 include a navigation system 124, a light system 126, an audio system 128, and an infotainment system 130 according to an exemplary embodiment. The navigation system 124 stores, calculates, and provides route and destination information and facilitates features like turn-by-turn directions. The light system 126 controls the lights of the vehicle to actuate, including, for example, exterior lights (e.g., turn signal lights) and/or interior lights such as the dashboard lights. The audio system 128 controls audio (e.g., audio content, volume) in the host vehicle 202. The infotainment system 130 provides visual information and/or entertainment and can include a display 132.

The vehicle systems 122 include and/or are operably connected for computer communication to various vehicle sensors 134. The vehicle sensors 134 provide and/or sense information associated with the vehicle, the vehicle environment, and/or the vehicle systems 122. The vehicle sensors 134 can include, but are not limited to, vehicle sensors associated with the vehicle systems 122, other vehicle sensors associated with the host vehicle 202, and/or vehicle sensors that collect data regarding proximate vehicles that are proximate to the host vehicle 202.

The vehicle sensors 134 may be, but are not limited to, environmental sensors, vehicle speed sensors, accelerator pedal sensors, brake sensors, throttle position sensors, wheel sensors, anti-lock brake sensors, camshaft sensors, among others. In some embodiments, the vehicle sensors 134 are incorporated with the vehicle systems 122. For example, one or more vehicle sensors 134 may be incorporated with the navigation system 124 to monitor characteristics of the host vehicle 202, such as location and speed.

Additionally or alternatively, the vehicle sensors 134 can include, but are not limited to, image sensors, such as cameras, optical sensors, radio sensors, etc. mounted to the interior or exterior of the host vehicle 202 and light sensors, such as light detection and ranging (LiDAR) sensors, radar, laser sensors etc. mounted to the exterior or interior of the host vehicle 202. Further, vehicle sensors 134 can include sensors external to the host vehicle 202 (accessed, for example, via the network 136), for example, external cameras, radar and laser sensors on other vehicles in a vehicle-to-vehicle network, street cameras, surveillance cameras, among others. The vehicle sensors 134 monitor the environment of the host vehicle 202 to detect the presence of proximate vehicles. Additionally, the vehicle sensors 134 may detect characteristics of the one or more proximate vehicles, such as location and speed of the proximate vehicles, as well as relative characteristics of the host vehicle and the proximate vehicle, such as relative distance and speed between the host vehicle 202 and the one or more proximate vehicles. The vehicle sensors 134 may also include relative characteristics of the proximate vehicle with respect to the roadway, such as, for example, to lane markers.

Accordingly, the vehicle sensors 134 are operable to sense data associated with proximate vehicles, the vehicle environment, the vehicle systems 122, and/or the host vehicle 202, and generate a data signal indicating a measurement of the sensed data. These data signals can be converted into other data formats (e.g., numerical) and/or used by the vehicle systems 122 and/or the VCD 102 to generate other data metrics and parameters. It is understood that the sensors can be any type of sensor, for example, acoustic, electric, environmental, optical, imaging, light, pressure, force, thermal, temperature, proximity, among others.

The VCD 102 is also operatively connected for computer communication to the network 136 and a distracted behavior database 138. It is understood that the connection from the I/O interface 110 to the network 136, and the distracted behavior database 138 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. In some embodiments, the distracted behavior database 138 could be located on-board the vehicle, at for example, the memory 106 and/or the disk 108. In other embodiments, the distracted behavior database 138 can be distributed in one or more locations.

The network 136 is, for example, a data network, the Internet, a wide area network or a local area network. The network 136 serves as a communication medium to various remote devices (e.g., databases, web servers, remote servers, application servers, intermediary servers, client machines, other portable devices). In some embodiments, the distracted behavior database 138 may be included in the network 136, accessed by the VCD 102 through the network 136, and/or the network 136 can access the distracted behavior database 138. Thus, in some embodiments, the VCD 102 can obtain data by accessing the distracted behavior database 138 via the network 136.

Figure 2:
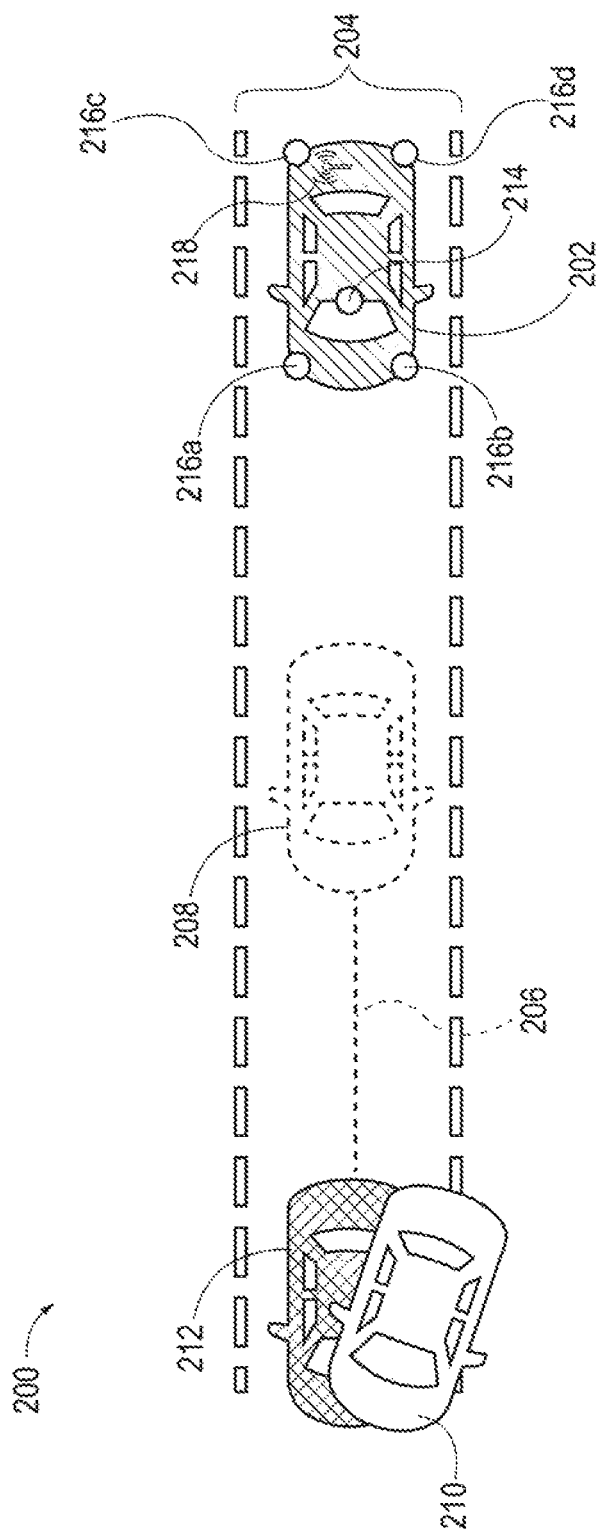
FIG. 2 is a schematic diagram of a host vehicle tracking a proximate vehicle into the future according to an exemplary embodiment.

The application of systems and methods are described with respect to the host vehicle 202 on a roadway 200, shown in FIG. 2. The host vehicle 202 is a vehicle having the operating environment 100 described above. Here, the host vehicle 202 is traveling in a lane 204 having a centerline 206. The centerline 206 is exemplary in nature and may not be marked on the lane 204. The roadway 200 with the lane 204 is an example embodiment of the roadway 200 and various configurations may be used. For example, the roadway 200 may have any number lanes.

The host vehicle 202 will be described with respect to a proximate vehicle 208, an observed proximate vehicle 210, and the predicted proximate vehicle 212. The actual behavior of the proximate vehicle 208 is represented by the observed proximate vehicle 210. The estimated behavior of the proximate vehicle 208 is represented by the predicted proximate vehicle 212. However, the proximate vehicle 208 may also be a host vehicle having the operating environment 100.

Using the system and network configuration discussed above, a distraction determination can be provided based on real-time information. Detailed embodiments describing exemplary methods using the system and network configuration discussed above will now be discussed in detail.

II. Methods for Distracted Driving

Figure 3:
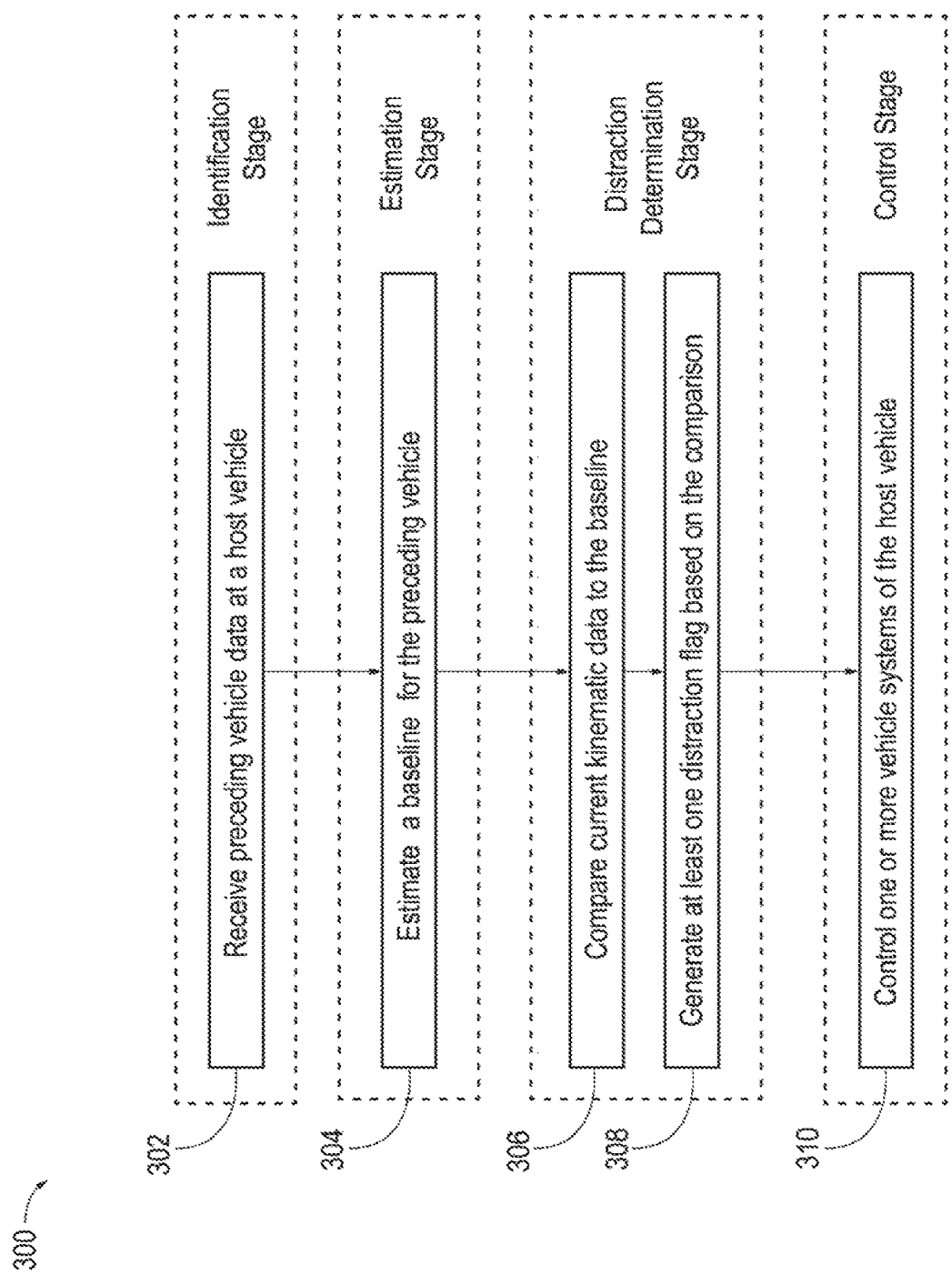
FIG. 3 is a process flow diagram of a method for distracted driving detection according to an exemplary embodiment.

Referring now to FIG. 3, a method 300 for distract driving detection will now be described according to an exemplary embodiment. FIG. 3 will also be described with reference to FIGS. 1 and 2.

As shown in FIG. 3, the method for determining distracted driving behavior in a proximate vehicle 208 can be described by four stages, namely, (A) identification, (B) estimation, (C) distraction determination, and (D) control. For simplicity, the method 300 will be described by these stages, but it is understood that the elements of the method 300 can be organized into different architectures, blocks, stages, and/or processes.

A. Identification Stage

With respect to FIG. 3, at block 302, the identification stage includes receiving proximate vehicle data about a proximate vehicle 208 at the data receiving module 114. Accordingly, the proximate vehicle identification processes described below are performed by, coordinated by, and/or facilitated by the data receiving module 114 of the host vehicle 202. The data receiving module 114 may additionally utilize other components of the operating environment 100, including the vehicle systems 122 and/or the vehicle sensors 134.

In some embodiments, the data receiving module 114 may identify the proximate vehicle 208 from proximate vehicles in the area surrounding the host vehicle 202. The proximate vehicle may be any vehicle within sensor range of the host vehicle 202. The sensor range may include the range of the vehicle sensors 134 interior to the vehicle or affixed to the exterior of the host vehicle 202. The sensor range may also include sensor data received from the other vehicles, for example, through V2V communications or roadway infrastructure, such as the roadside equipment. In another embodiment, whether the proximate vehicle 208 is proximate to the host vehicle 202 may be based on the type of communication between the host vehicle 202 and the proximate vehicle 208. In another embodiment, proximity may be based on a predetermined proximate distance, communication timing, sensor capability, and location, among others.

Here, the proximate vehicle 208 is partially ahead of the host vehicle 202 in position on the roadway 200. For example, the proximate vehicle 208 may be the vehicle directly ahead of the host vehicle 202 in the lane 204, as shown in FIG. 2. In another embodiment, the proximate vehicle 208 may be preceding the host vehicle 202 in an adjacent lane of the lane 204 ahead of the host vehicle 202. For example, the front end of the proximate vehicle 208, in an adjacent lane, may only be a meter ahead of the host vehicle 202 in the lane 204. Accordingly, the proximate vehicle 208 may be in a different lane than the host vehicle 202.

As described above, the operating environment 100 includes the processor 104 having the data receiving module 114. The data receiving module 114 may identify a proximate vehicle 208 using data received from the vehicle systems 122 and/or the vehicle sensors 134. The vehicle sensors 134 may include one or more optical sensors (e.g., radio detection and ranging (RADAR) device, light imaging detection and ranging (LiDAR) device, etc.), image sensors (e.g., camera, magnetic resonance imager, x-ray imager, etc.), and/or other ranging sensors.

For example, the vehicle sensors 134 of the host vehicle 202 may include a forward sensor 214. The forward sensor 214 may be image sensor, such as camera, or an optical sensor, such a RADAR or LiDAR device. As shown here, the forward sensor 214 may have a 160 meter range and a 20° field of view. The forward sensor 214 may be mounted to the interior or exterior of the host vehicle 202. The mounting (not shown) of the forward sensor 214 may be fixable to hold the forward sensor 214 in a fixed position or a radial mounting to allow the forward sensor 214 to rotate about the host vehicle 202. The forward sensor 214 may detect visible and infra-red light from proximate vehicles in the vicinity of the host vehicle 202.

The vehicle sensors 134, may additionally include corner sensors 216a-216d, shown in FIG. 2. In one embodiment, the corner sensors 216a, 216b, 216c, and 216d may be RADAR sensors or any other kind of sensors for identifying at least one proximate vehicle. The vehicle sensors 134 can be disposed on any location of the interior or exterior of the host vehicle 202. For example, the vehicle sensors 134 can be disposed in the doors, bumpers, wheel wells body, rearview mirror, side view mirror, dashboard, rear window, etc. In one example, the corner sensors 216a-216d may be mounted at corners of the vehicle.

The host vehicle 202 monitors the proximate vehicle 208 once the proximate vehicle 208 is identified as a proximate vehicle and receives proximate vehicle data about the proximate vehicle 208. In some embodiments, the monitoring is performed periodically at predetermined intervals. For example, the data receiving module 114 may receive the proximate vehicle data from the vehicle systems 122 and/or vehicle sensors 134 as input signals at predetermine intervals. Suppose, the interval is 5 seconds. At a first time, such as t=0 seconds, the data receiving module 114 receives proximate vehicle data about the progress of the proximate vehicle 208, such as the relative distance between the host vehicle 202 and the proximate vehicle 208, as well as the speed of the host vehicle 202 and the speed of the proximate vehicle 208 at a second time t=5, at a third time t=10, etc. Accordingly, the data receiving module 114 may continue to receive proximate vehicle data as the host vehicle 202 and the proximate vehicle 208 travel.

The vehicle sensors 134 may measure data from proximate vehicles located near the host vehicle 202, such as the proximate vehicle 208 and that vehicle in the future as the observed proximate vehicle 210. For example, the vehicle sensors 134 may measure the proximate vehicle data associated with the timing, location, velocity, and acceleration of a proximate vehicle and attribute the proximate vehicle data to the proximate vehicle using a vehicle identifier. The data receiving module 114 receives the proximate vehicle data from the vehicle sensors 134 about proximate vehicles and identifies at least one proximate vehicle based on the proximate vehicle data. For example, the proximate vehicle 208 may be identified based on the relative location of the proximate vehicle 208 to the host vehicle 202.

The vehicle sensors 134 may be continuously or periodically measuring proximate vehicle data with respect to the proximate vehicle 208. The measured proximate vehicle data include current kinematic data or may be used to generate current kinematic data. The current kinematic data (e.g., position, velocity, and acceleration) reflects the current motion of the proximate vehicle 208. The current kinematic data may also include relative data between the proximate vehicle 208 and the host vehicle 202 (e.g., relative velocity, spacing between proximate vehicles, etc.). In this manner, the current kinematic data is a snapshot of the proximate vehicle 208 as represented by various values of motion data. For example, the current kinematic data may include an acceleration value based on the proximate vehicle data that the vehicle sensors 134 have been aggregating. Therefore, the proximate vehicle data can be tracked over time and the current kinematic data reflects the proximate vehicle 208 in the present, as represented by the observed proximate vehicle 210.

As discussed above, the data receiving module 114 may also receive proximate vehicle data directly from proximate vehicles over the network 136 as computer communication received at a transceiver 218 (shown in FIG. 2). For example, the transceiver 218 may allow the host vehicle 202 to receive the proximate vehicle data over a vehicle-to-vehicle network directly from proximate vehicles. In this manner, the data receiving module 114 may receive the proximate vehicle data and/or a vehicle identifier directly from the proximate vehicle 208. In another embodiment, the data receiving module 114 may receive the proximate vehicle data from remote sensors (accessed, for example, via the network 136), for example, external cameras, street cameras, roadside equipment, surveillance cameras, in-pavement sensors, among others. Accordingly, the data receiving module 114 can receive proximate vehicle data for proximate vehicles that are outside of the range of the vehicle sensors 134, such as the forward sensor 214 and/or corner sensors 216a-216d. The data receiving module 114 may identify the proximate vehicle 208 in real-time and/or store, aggregate, and track the proximate vehicle data. Furthermore, the data receiving module 114 may calculate missing proximate vehicle data. For example, the data receiving module 114 may use position and timing information from the proximate vehicle data to calculate speed.

B. Estimation Stage

In the estimation stage, with respect to FIG. 3, at block 304, the method 300 includes estimating, with the estimation module 116, a baseline for the proximate vehicle 208 at a predetermined time represented by the predicted proximate vehicle 212. In particular, the estimation module 116 of the processor 104 estimates the baseline corresponding to the expected behavior of the proximate vehicle 208 illustrated by the predicted proximate vehicle 212. The estimation processes described below are performed by, coordinated by, and/or facilitated by the estimation module 116 of the host vehicle 202. The estimation module 116 may additionally utilize other components of the operating environment 100, including the vehicle systems 122 and/or the vehicle sensors 134.

In one embodiment, the estimation module 116 may estimate one or more baselines for different types of proximate vehicle data. The baseline may be estimated for a particular predetermined time. In other embodiments, the predetermined amount of time is a range of time, such that the baseline includes an estimate of predicted kinematic data over the range of time. The baseline may be continuous over the range of time or be periodically estimated over the range of time. For example, the baseline may include predicted kinematic data sampled in 50 millisecond (ms) increments over a range of time, such as a minute.

The estimation module 116 calculates the baseline based on proximate vehicle data received by the data receiving module 114. In particular, the proximate vehicle data may be applied to one or more motion models. A motion model is a model of expected behavior of a vehicle. The motion model may be CV (constant velocity) model, CA (constant acceleration) model, CSAV (constant steering angle and velocity) model, CTRV (constant turn rate and velocity) model, CTRA (constant turn rate and acceleration) model, and/or a CCA (constant curvature and acceleration) model, as will be described in greater detail below. The models may be stored in the memory 106 and/or be accessed in the vehicle behavior database 138.

The proximate vehicle data may be applied to a motion model using a model fitting method. The model fitting method may be, for example, a Linear Kalman Filter, an Extended Kalman Filter and/or an Unscented Kalman filter. The extended Kalman Filter is a first-order approximation when a transition equation is not linear and the unscented Kalman Filter is a second-order approximation when the transition equation is not linear. The model fitting method may be based on the model used. For example, to fit the CA model and CTRA model, the Linear Kalman Filter and Extended Kalman Filter may be used. Accordingly, the estimation module 116 of the host vehicle 202 may use the proximate vehicle data in conjunction with one or more motion models possibly using one or more model fitting methods to estimate a baseline corresponding to the expected behavior of the proximate vehicle 208.

C. Distraction Determination Stage

With respect to FIG. 3, at block 306, the method 300 includes comparing, with the determination module 118, current kinematic data about the proximate vehicle 208 at the predetermined time to the baseline. Furthermore, at block 308, the distraction determination stage includes generating distraction flags associated with the proximate vehicle 208 based on the comparison. Therefore, the determination module 118 identifies distraction flags for the proximate vehicle 208 based on current kinematic data about the proximate vehicle 208 relative to the baseline. The determination processes described below are performed by, coordinated by, and/or facilitated by the determination module 118 of the host vehicle 202. The determination module 118 may additionally utilize other components of the operating environment 100, including the vehicle systems 122 and/or the vehicle sensors 134.

In some embodiments, the determination module 118 may compare the current kinematic data about the proximate vehicle 208 at a predetermined time to the predicted kinematic data of the baseline corresponding to predicted kinematic data for the predetermined time. As discussed above, the current kinematic data is a snapshot of the proximate vehicle data at a point in time. Therefore, in some embodiments, the determination module 118 makes determinations about distraction based on the actual behavior of the proximate vehicle 208, represented by the observed proximate vehicle 210, as compared to the estimated behavior of the proximate vehicle 208 from the baseline, represented by the predicted proximate vehicle 212.

The comparison of the observed proximate vehicle 210 and the predicted proximate vehicle 212 may be based on one or more kinematic values of the current kinematic data and the baseline. For example, the comparison may include the relative distance between the host vehicle 202 and the proximate vehicle 208 at a first time, as well as the speed of the host vehicle 202 and the speed of the proximate vehicle 208 at a second time t=5, at a third time t=10, etc. These comparisons may be based on ranges, window, thresholds, or predetermined settings. For example, suppose the relative distance between the observed proximate vehicle 210 and the host vehicle 202 is less than the predicted relative distance between the predicted proximate vehicle 212 and the host vehicle 202. The determination module 118 may identify a distraction flag based on the comparison at the first time if the relative distance is smaller than a distraction threshold. A distraction flag may be identified when the current kinematic data exceeds the one or more baselines by a distraction threshold. In another embodiment, a distraction flag may be generated if two consecutive comparisons are smaller than the distraction threshold. For example, a distraction flag may be generated at a second time if the comparison illustrates that the relative distance is smaller than the distraction threshold at the first time and the second time. A distraction flag may be identified when the current kinematic data exceeds the one or more baselines by the distraction threshold.

In other embodiments, the determination module 118 may use the current kinematic data to generate different types of distraction flags based on different types of baselines. For example, the baselines may include (1) a Lane Offset Value (LOV) baseline for generating offset flags and (2) a Lane Offset Error (LOE) baseline for generating variation flags, as will be described in greater detail below.

1. Lane Offset Value (LOV)

An LOV is a measurement that indicates how far the observed proximate vehicle 210 has laterally deviated from the path predicted of an LOV baseline. In one embodiment, the predicted path may be estimated according to the centerline 206. As discussed above the centerline 206 may not be projected on the roadway 200 but a predicted path of the predicted proximate vehicle 212. The centerline 206 may be calculated based on the predicted width of the lane 204 or the measured width of the lane 204 by the vehicle systems 122 and/or the vehicle sensors. In another embodiment, the centerline 206 may be received or calculated based on sensor data received from other vehicles or remote sensors (e.g., street cameras, roadside equipment, etc.). Therefore, the LOV may be a distance measurement between the observed proximate vehicle 210 and the predicted proximate vehicle 212 in that the LOV measures the amount by which the proximate vehicle 208 has deviated from the centerline 206 of the lane 204 during traveling.

In another embodiment, the baseline may include a deviation threshold about the predicted path. The deviation threshold may be a predetermined amount of distance about the centerline 206 that is considered acceptable lateral movement about the predicted path. For example, the deviation threshold may be a two-foot distance extending in ether lateral direction perpendicular to the centerline 206. The deviation threshold may be estimated by the estimation module 116 based on the proximate vehicle data. For example, the proximate vehicle data may track lateral movement.

In some embodiments, the deviation threshold may be a dynamic value based on the circumstances on the roadway 200. For example, suppose there is a large vehicle passing the proximate vehicle 208. The proximate vehicle 208 may approach the lane line opposite large vehicle to add lateral distance between the large vehicle and the proximate vehicle 208. The LOV measurement may be based on whether the proximate vehicle 208 exhibits lateral movement outside of the lane 204. For example, the proximate vehicle 208 is approaching a lane line of the lane 204 may be within the deviation threshold when a large vehicle is passing. In other embodiments, the LOV baseline may be calculated using the one or more motion models.

The LOV may be a position measurement of the current kinematic data. For example, the LOV may be an actual distance measurement made by the vehicle sensors 134 of the host vehicle 202 or communicated to the host vehicle 202 from the observed proximate vehicle 210. In another embodiment, the actual distance measurement may be made by roadside sensing equipment and received by the host vehicle 202. In some embodiments, the actual distance measurement is received at the data receiving module 114. The determination module 118 may then compare the baseline to the actual distance measurement to calculate the LOV and determine whether a distraction flag should be identified.

2. Lane Offset Error (LOE)

The LOE is the degree to which the proximate vehicle 208 behaves as predicted. In other words, how far has the current kinematic data represented by the observed proximate vehicle 210 deviates from the predicted kinematic data of the baseline, represented by the predicted proximate vehicle 212. As discussed above, the current kinematic data regarding the observed proximate vehicle 210 is received at the data receiving module 114.

The LOE baseline for the LOE, may be determined using the proximate vehicle data about the proximate vehicle 208. As described above, the proximate vehicle data may be applied to a motion model, such as the Constant Velocity (CV) model. The CV model is represented by the following state equation which is a vector matrix based on an assumption of constant velocity. For example, with respect to the CV model, suppose the proximate vehicle speed is constant within a sampling interval, for example $\Delta t=0.1$ sec, and uses a four-dimensional state vector to formulate a transition equation as:

$$\begin{pmatrix} L_{x,k+1} \\ L_{y,k+1} \\ V_{x,k+1} \\ V_{y,k+1} \end{pmatrix} = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix} \begin{pmatrix} L_{x,k} \\ L_{y,k} \\ V_{x,k} \\ V_{y,k} \end{pmatrix} + W = \begin{pmatrix} L_{x,k} + V_{x,k}\Delta t \\ L_{y,k} + V_{y,k}\Delta t \\ V_{x,t} \\ V_{y,t} \end{pmatrix} + W$$

where Lx, Ly, Vx and Vy denote longitudinal position, lateral position, longitudinal velocity, and lateral velocity, respectively. The transition equation is the function corresponding to the vector matrix of the state equation. The W is the process noise following a multivariate normal distribution with mean 0 and covariance matrix Q. The behavior of the proximate vehicle 208 is modeled by plugging the proximate vehicle data into an estimation equation denoted by Z, which is related to the state vector via:

$$Z_{k+1} = \begin{pmatrix} 0 & 0 & 1 & 0 \\ 0 & 1 & 0 & 0 \end{pmatrix} \begin{pmatrix} L_{x,k+1} \\ L_{y,k+1} \\ V_{x,k+1} \\ V_{y,k+1} \end{pmatrix} + U = \begin{pmatrix} V_{x,k+1} \\ L_{y,k+1} \end{pmatrix} + U$$

where U is the measurement error that follows a normal distribution with mean 0 and covariance matrix R. If the proximate vehicle data is available for Lx, Ly, Vx and Vy, a 1 is present in the matrix, if the proximate vehicle data is unavailable then the value in the matrix can be set to 0. In this manner, the estimation equation can be tailored to the available proximate vehicle data. Thus, the CV model uses the proximate vehicle data to predict a baseline for the proximate vehicle 208, represented by the predicted proximate vehicle 212.

In another embodiment, the baseline for the LOE, may be determined using the proximate vehicle data associated with the Constant Acceleration (CA) model. The CA model is represented by the following state equation which is a vector matrix based on an assumption of constant acceleration. For example, with respect to the CA model, suppose that the vehicle acceleration is constant within sampling intervals. The two or more dimensions may be used to describe longitudinal (ax) and lateral accelerations (ay) besides the four dimensions in the CV model. The transition equation may be written as:

$$\begin{pmatrix} L_{x,k+1} \\ L_{y,k+1} \\ V_{x,k+1} \\ V_{y,k+1} \\ a_{x,k+1} \\ a_{y,k+1} \end{pmatrix} =$$

$$\begin{pmatrix} 1 & 0 & \Delta t & 0 & \frac{1}{2}\Delta t^2 & 0 \\ 0 & 1 & 0 & \Delta t & 0 & \frac{1}{2}\Delta t^2 \\ 0 & 0 & 1 & 0 & \Delta t & 0 \\ 0 & 0 & 0 & 1 & 0 & \Delta t \\ 0 & 0 & 0 & 0 & 1 & 0 \\ 0 & 0 & 0 & 0 & 0 & 1 \end{pmatrix} \begin{pmatrix} L_{x,k} \\ L_{y,k} \\ V_{x,k} \\ V_{y,k} \\ a_{x,k} \\ a_{y,k} \end{pmatrix} + W = \begin{pmatrix} L_{x,k} + V_{x,k}\Delta t + \frac{1}{2}a_{x,k}\Delta t^2 \\ L_{y,k} + V_{y,k}\Delta t + \frac{1}{2}a_{y,k}\Delta t^2 \\ V_{x,k} + a_{x,k}\Delta t \\ V_{y,k} + a_{y,k}\Delta t \\ a_{x,k} \\ a_{y,k} \end{pmatrix} + W$$

where W is the process noise. In some embodiments, the proximate vehicle data may include the longitudinal velocity and lateral position. Therefore, the observation vector Z is written as:

$$Z_{k+1} = \begin{pmatrix} 0 & 0 & 1 & 0 & 0 & 0 \\ 0 & 1 & 0 & 0 & 0 & 0 \end{pmatrix} \begin{pmatrix} L_{x,k+1} \\ L_{y,k+1} \\ V_{x,k+1} \\ V_{y,k+1} \\ a_{x,k+1} \\ a_{y,k+1} \end{pmatrix} + U = \begin{pmatrix} V_{x,k+1} \\ L_{y,k+1} \end{pmatrix} + U$$

where U is the measurement error. Thus, as discussed above with respect to the CV model, the estimation equation is tailored to the available proximate vehicle data. Accordingly, the CA model also uses the proximate vehicle data to predict a baseline for the proximate vehicle 208, represented by the predicted proximate vehicle 212.

In another embodiment, the baseline for the LOE, may be determined using the proximate vehicle data associated with the Constant Turn Rate and Acceleration (CTRA) model. The CTRA model is represented by the following state equation which is a vector matrix based on an assumption of longitudinal acceleration and yaw rate being constant within a sampling interval. Here, the state vector may be $x_{t+1}=[x, y, \theta, v, w, a]^T$, representing longitudinal position, lateral position, vehicle heading angle, longitudinal velocity, yaw rate and longitudinal acceleration, respectively. The transition equation is modelled by a transition function f:

$$x_N = f(x_t) + u, u \sim N(0, Q);$$

where u is the process noise. The transition function f is calculated according physics:

$$x_{t+\Delta t} = x_t + \frac{v_t}{\omega_t}(\sin(\theta_t + \omega_t \Delta t) - \sin(\theta_t)) +$$

$$\frac{a_t \Delta t}{\omega_t}\sin(\theta_t + \omega_t \Delta t) - \frac{a_t}{\omega_t^2}\cos(\theta_t) + \frac{a_t}{\omega_t^2}\cos(\theta_t + \omega_t \Delta t)$$

$$y_{t+\Delta t} = y_t + \frac{v_t}{\omega_t}(\cos(\theta_t) - \cos(\theta_t + \omega_t \Delta t)) -$$

$$\frac{a \Delta t}{\omega_t}\cos(\theta_t + \omega_t \Delta t) + \frac{a_t}{\omega_t^2}\sin(\theta_t + \omega_t \Delta t) - \frac{a_t}{\omega_t^2}\sin(\theta_t)$$

$$\theta_{t+\Delta t} = \theta_t + \omega_t \Delta t$$

$$v_{t+\Delta t} = v_t + a_t \Delta t$$

$$\omega_{t+\Delta t} = \omega_t$$

$$a_{t+\Delta t} = a_t$$

which is a nonlinear function of the state vector. As described above, a method fitting model may be used to apply the motion model to the proximate vehicle data. For example, the Extended Kalman Filter approximates the transition function f by using its Jacobian matrix J, where $$J = \begin{pmatrix} 1 & 0 & a_1 & a_2 & a_3 & a_4 \\ 0 & 1 & a_5 & a_6 & a_7 & a_8 \\ 0 & 0 & 1 & 0 & \Delta t & 0 \\ 0 & 0 & 0 & 1 & 0 & \Delta t \\ 0 & 0 & 0 & 0 & 1 & 0 \\ 0 & 0 & 0 & 0 & 0 & 1 \end{pmatrix}$$

and a's are partial derivative off with respect to each dimension of the state vector x. This approximation yields $x_{t+1} \approx Jx_t + u$. The longitudinal velocity, lateral position and yaw rate are observable on each sampling point. Therefore, the observation vector Z may be:

$$z_{t+1} = Hx_{t+1} + r = \begin{pmatrix} y_{t+1} \\ v_{t+1} \\ \omega_{t+1} \end{pmatrix} + r, \ r \sim N(0, R).$$

Here $$H = \begin{pmatrix} 0 & 1 & 0 & 0 & 0 & 0 \\ 0 & 0 & 0 & 1 & 0 & 0 \\ 0 & 0 & 0 & 0 & 1 & 0 \end{pmatrix}$$

and r denotes the measurement error.

In another embodiment, x may the state vector, F denote the transition matrix and Q denote the process noise. Accordingly, the Kalman Filter may be used to predict the distribution of X at time k with information from time 1 to k−1 and fit the distribution of X at time k given information from time 1 to k. This prediction may be denoted by:

$$\hat{X}_{(k|k-1)} = F\hat{X}_{(k-1|k-1)} \text{ and}$$

$$\hat{P}_{(k|k-1)} = FP_{(k-1|k-1)}F^T + Q,$$

where $\hat{X}_{(k|k-1)}$ and $P_{(k|k-1)}$ denote the predicted mean and covariance at time k given information from time 1 to k−1, respectively. Pre-fit residuals may be obtained by comparing the predicted signals with observed signals:

$$\tilde{Y}_k = Z_k - H\hat{X}_{(k|k-1)}$$

The corresponding covariance matrix for the pre-fit residuals can be calculated as:

$$S_k = R + HP_{(k|k-1)}H^T$$

The optimal Kalman gain and obtain the post-fit distributions can be calculated by including the information of the observation at time k:

$$K_k = P_{(k|k-1)}H^T S_k^{-1},$$

$$\hat{X}_{(k|k)} = \hat{X}_{(k|k-1)} + K_k \tilde{Y}_k,$$

$$P_{(k|k)} = (1 - K_k H)P_{(k|k-1)}.$$

The post-fit residual can be calculated as $\tilde{y}_{(k|k)} = Z_k - H\hat{X}_{k|k}$ accordingly.

Additionally, the calculated LOE may be corrected for measurement error and process noise. In some embodiments, the measurement errors of different signals are assumed to be independent of each other. The R matrix for different models may then be assumed to be diagonal matrix with each diagonal element representing the variance of measurement errors of the corresponding signals. In this example model, the variance of measurement errors of the proximate vehicle data may be specified, which are longitudinal velocity, lateral position and yaw rate. For example, they take empirical values as 0.01, 0.45, and 0.1.

The process noise is the signal magnitude that is omitted in the transition model. The derivation requires the assumption that the acceleration and yaw rate are random variables within the sampling interval. Specifically, they may be assumed to be follow a normal distribution with known mean and variance. In the CV model, the longitudinal and lateral acceleration independently may be assumed to follow normal distribution with mean zero and variance $\sigma^2_{a,x}$ and $\sigma^2_{a,y}$. For example, the Q matrix is derived by comparing CV model with the model with random accelerations, which is:

$$Q_{CV} = \begin{pmatrix} \frac{1}{4}\Delta t^4 \sigma^2_{a,x} & 0 & \frac{1}{2}\Delta t^3 \sigma^2_{a,x} & 0 \\ 0 & \frac{1}{4}\Delta t^4 \sigma^2_{a,y} & 0 & \frac{1}{2}\Delta t^3 \sigma^2_{a,y} \\ \frac{1}{2}\Delta t^3 \sigma^2_{a,x} & 0 & \Delta t^2 \sigma^2_{a,x} & 0 \\ 0 & \frac{1}{2}\Delta t^3 \sigma^2_{a,y} & 0 & \Delta t^2 \sigma^2_{a,y} \end{pmatrix}$$

Similarly, the Q matrix for CA and CTRA model may be:

$$Q_{CA} = \begin{pmatrix} \frac{1}{4}\Delta t^4 \sigma^2_{a,x} & 0 & \frac{1}{2}\Delta t^3 \sigma^2_{a,x} & 0 & \frac{1}{2}\Delta t \sigma^3_{a,x} & 0 \\ 0 & \frac{1}{4}\Delta t^4 \sigma^2_{a,y} & 0 & \frac{1}{2}\Delta t^3 \sigma^2_{a,y} & 0 & \frac{1}{2}\Delta t \sigma^3_{a,y} \\ \frac{1}{2}\Delta t^3 \sigma^2_{a,x} & 0 & \Delta t^2 \sigma^2_{a,x} & 0 & \Delta t \sigma^2_{a,x} & 0 \\ 0 & \frac{1}{2}\Delta t^3 \sigma^2_{a,y} & 0 & \Delta t^2 \sigma^2_{a,y} & 0 & \Delta t \sigma^2_{a,y} \\ \frac{1}{2}\Delta t \sigma^3_{a,x} & 0 & \Delta t \sigma^2_{a,x} & 0 & \sigma^2_{a,x} & 0 \\ 0 & \frac{1}{2}\Delta t \sigma^3_{a,y} & 0 & \Delta t \sigma^2_{a,y} & 0 & \sigma^2_{a,y} \end{pmatrix},$$

$$G = \begin{pmatrix} a_4 & a_3 \\ a_8 & a_7 \\ 0 & \Delta t \\ \Delta t & 0 \\ 0 & 1 \\ 1 & 0 \end{pmatrix}$$

$$Q_{CTRV} = G \begin{pmatrix} \sigma^2_a & 0 \\ 0 & \sigma^2_\omega \end{pmatrix} G^T$$

These Q matrix may be determined by the standard deviation of longitudinal acceleration, lateral acceleration and yaw rate. Those values are pre-specified based on empirical knowledge, which are 0.3, 0.1 and 0.1, respectively.

In some embodiments, multiple motion models can be used in conjunction to calculate the LOE. Multiple motion models may be used to switch between different motion models to check the prediction accuracy. Checking the prediction accuracy may include normalizing the model fitting methods. For example, because the pre-fit residual in a Kalman Filter follow normal distribution with mean 0 and a covariance matrix $S_k^{(i)}$. The likelihood is calculated as the density of the multivariate normal distribution:

$$L_k^{(i)} = f(\tilde{Y}_k^{(i)})$$

$$\tilde{Y}_k^{(i)} = Z_k^{(i)} - H\hat{X}_{(k|k-1)}^{(i)}$$

$$S_k^{(i)} = HP_k^{(i)}H^T + R$$

where i represents the model index (i=1: CV, i=2: CA, i=3: CTRA). Normalizing the likelihood yields weight coefficients for each of the tracking models:

$$w_k^{(i)} = \frac{L_k^{(i)}}{\sum_{j=1}^{3} L_k^{(j)}}.$$

The overall post-fit state vector is then calculated as the weighted average of the post-fit state vector of each of the tracking models as:

$$\hat{X}_{k|k} = \sum_{i=1}^{3} w_k^{(i)} \hat{X}_{k|k}^{(i)}$$

The CV model, the CA model, and CTRA model, described above, are exemplary in nature. One or more of the motion models may be used based one or more considerations, including the configuration of the roadway 200, the types of proximate vehicle data, behavior of the proximate vehicle 208, sensor availability and range of the host vehicle 202, among others. Likewise, the model fitting methods may be applied to the motion model based on one or more similar considerations.

As described above, the determination module 118 identifies distraction flags associated with the proximate vehicle based on the comparison of the baseline to the current kinematic data. Different types of distraction flags may be identified based on the type of current kinematic data compared to the baseline. For example, the determination module 118 may uses the LOV to generate offset flags and the LOE to generate variance flags. For example, when the actual lane offset value exceeds a threshold, an offset flag is applied to the actual lane offset value. Likewise, when the lane offset error value exceeds a range, a variance flag is applied to the actual lane offset error value.

D. Control Stage

With respect to FIG. 3, at block 310, the method 300 includes controlling one or more vehicle systems 122 of the host vehicle 202 based on the identified distraction flags. Accordingly, the control processes described below are performed by, coordinated by, and/or facilitated by the control module 120 of the host vehicle 202. The control module 120 may additionally utilize other components of the operating environment 100, including the vehicle systems 122 and/or the vehicle sensors 134.

The vehicle systems 122 of the host vehicle 202 may be altered to specifically address the distraction flags. For example, suppose that a distance distraction flag indicates that the relative distance between the observed proximate vehicle 210 and the host vehicle 202 is shorter than predicted. When a distance distraction flag is generated, the control module 120 may initiate a braking maneuver and/or lane maneuver suggestion may be provided to navigation system 124 of the host vehicle 202, or audio and/or visual alert using the display 132, the light system 126, the audio system 128 and/or the infotainment system 130. Therefore, the control module 120 may control the vehicle systems 122 of the host vehicle 202 to specifically address the event and/or issue with the distracted driving behavior of the proximate vehicle 208 that caused the distraction flag to be generated. In some embodiments, the control module 120 may control the host vehicle 202 to the operation of the host vehicle 202 associated with the current kinematic data to satisfy the distraction threshold. For example, the control module 120 may control the vehicle systems 122 to create the relative distance between the observed proximate vehicle 210 and the host vehicle 202 denoted by the distraction threshold.

Additionally, semi-autonomous and fully autonomous responses can be provided to the host vehicle 202 to alter the settings of a plurality of the vehicle systems 122 of the host vehicle 202. For example, controlling of lateral movement of the host vehicle 202 to initiate a lane change to an adjacent lane. Other types of control can also be implemented. In some embodiments, the speed of the proximate vehicle 208 may be controlled in a cooperative manner. For example, the speed of the proximate vehicle 208 may be increased to increase the distance between the host vehicle 202 and the proximate vehicle 208.

Figure 4:
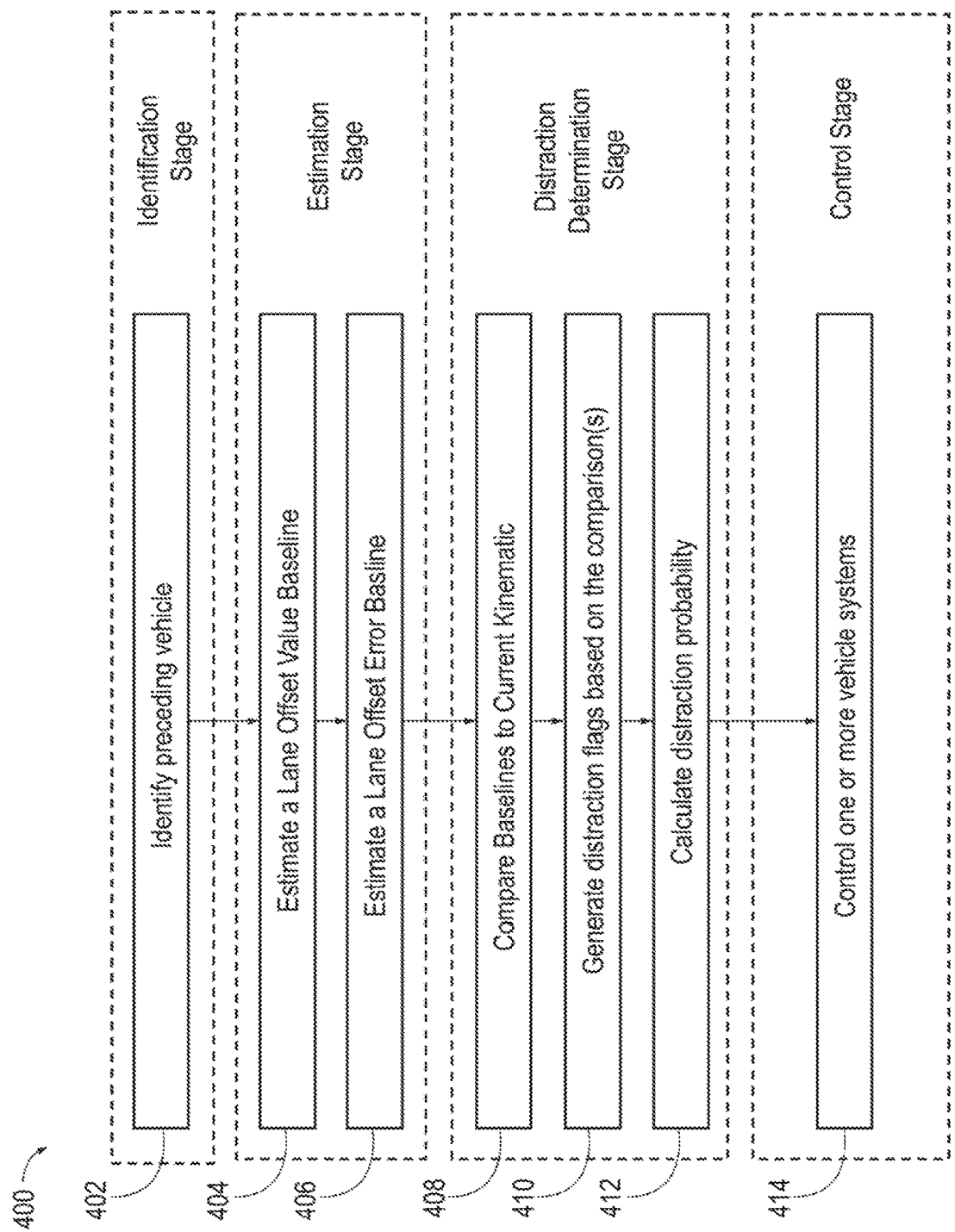
FIG. 4 is a process flow diagram of a method for distracted driving detection using a distraction probability according to an exemplary embodiment.

Referring now to FIG. 4, a method 400 for distracted driving detection using a distraction probability will now be described according to an exemplary embodiment. FIG. 4 will also be described with reference to FIGS. 1-3 and 5A-5E. As shown in FIG. 3, the method for four stages, namely, (A) identification, (B) estimation, (C) distraction determination, and (D) control. For simplicity, the method 400 will also be described by these stages, but it is understood that the elements of the method 400 can be organized into different architectures, blocks, stages, and/or processes.

In the identification stage, the method 400 includes, at block 402, receiving proximate vehicle data about the proximate vehicle 208. As described above, the proximate vehicle data may be collected continually or periodically. In some embodiments, the proximate vehicle data is monitored while the proximate vehicle 208 is within a predetermined distance of the host vehicle 202. The proximate vehicle data may include current kinematic data for the proximate vehicle 208 or the current kinematic data may be calculated from the proximate vehicle data.

Figure 5A:
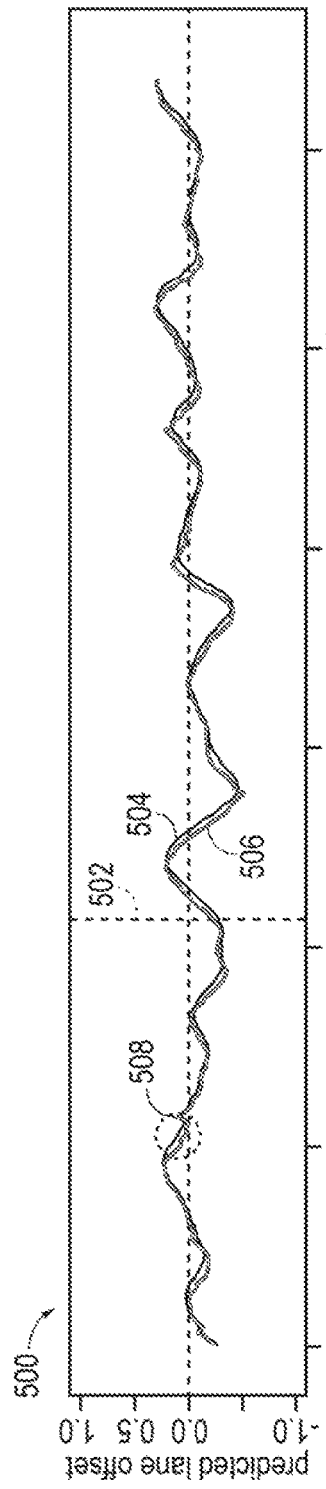
FIG. 5A is an example lane offset baseline in time for a distracted driver according to an exemplary embodiment.

In the estimation stage, the method 400 includes estimating baselines based on the on the predicted kinematic data of the proximate vehicle data. At block 404, an LOV baseline may be predicted based on one or more motion models, proximate vehicle data, as well as roadway data about the roadway 200. An example graphical representation of an LOV baseline 500 is shown in FIG. 5A. In particular, here, the LOV baseline 500 is measured as the predicted lane offset versus time. The predicted lane offset may be measured in meters. For example, the predicted lane offset on the y-axis, 0.0, may correspond to the centerline 206 of the roadway 200 as measured by the vehicle sensors 134 of the host vehicle 202 or communicated to the host vehicle 202 from proximate vehicles and/or roadside sensing equipment. Furthermore, the time on the x-axis may be measured in milliseconds, including a reference time 502.

As discussed above, the LOV baseline 500 may be estimated using one or more motion models. For example, the LOV baseline 500 includes a CA LOV prediction 504 corresponding to the CA motion model and a CTRA LOV prediction 506 corresponding to the CTRA motion model. At LOV baseline segment 508, both the CA LOV prediction 504 and the CTRA LOV prediction 506 predict that the proximate vehicle 208 will have some positive offset from the predicted path. Suppose that the predicted path includes the proximate vehicle 208 traveling along the centerline 206 of the lane 204 and that positive lateral movement indicates that the proximate vehicle 208 has moved right of the centerline 206. Accordingly, the LOV baseline segment 508 illustrates that both the CA LOV prediction 504 and the CTRA LOV prediction 506 predict that the proximate vehicle 208 will move right of center.

Figure 6:
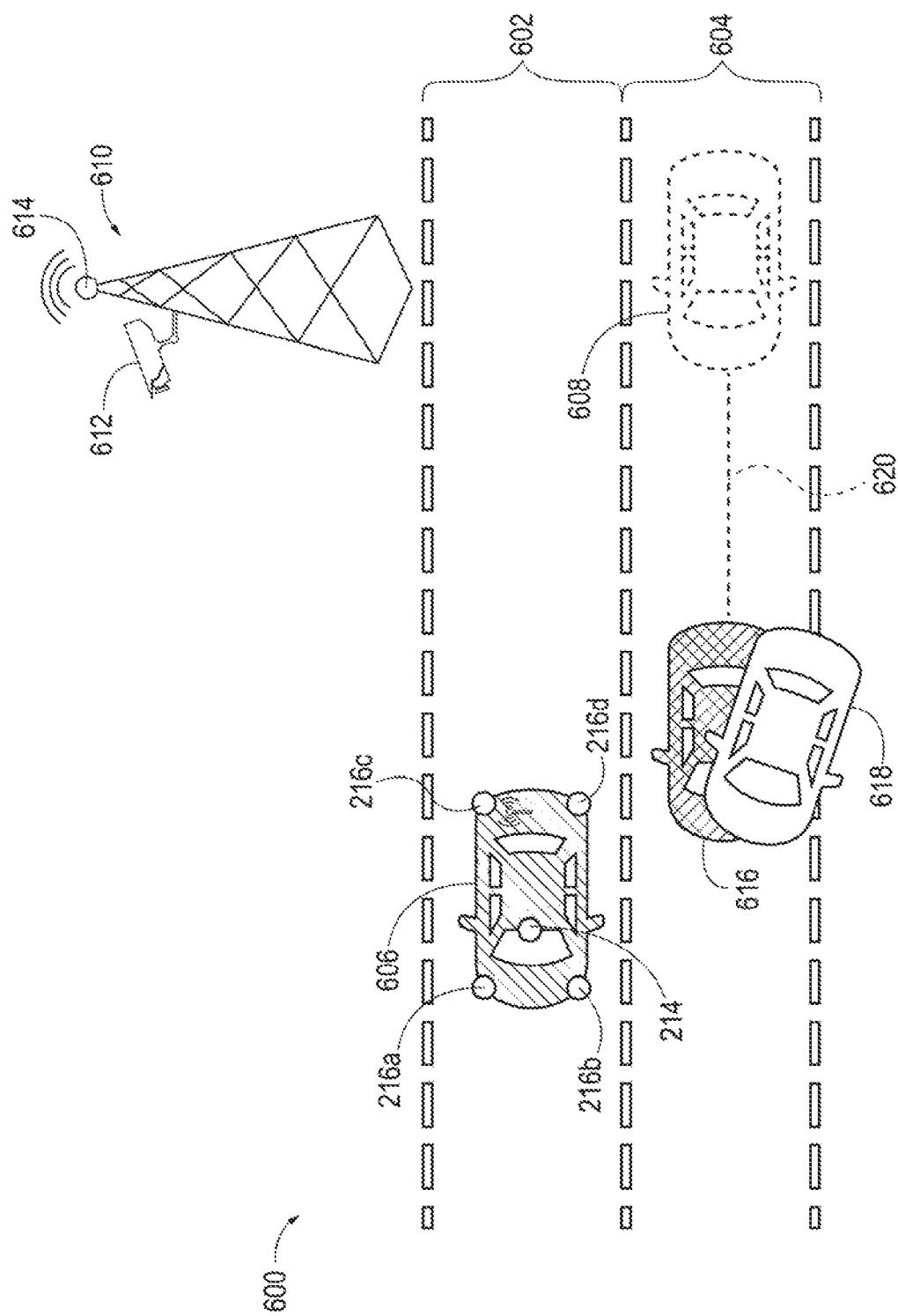
FIG. 6 is a schematic diagram of a host vehicle tracking a proximate vehicle into the future according to an exemplary embodiment.

In another embodiment, the LOV may be estimated based on sensor data from the host vehicle, proximate vehicles, and/or remote sensors. Turning to FIG. 6, suppose that a roadway 600 has a first lane 602 and a second lane 604, and that a host vehicle 606 is traveling in the first lane 602 and a proximate vehicle 608 is traveling in the second lane 604. In this example, the proximate vehicle 608 is at least partially behind the host vehicle in an adjacent lane. As discussed above, the proximate vehicle 608 may be in the same or a different lane as the host vehicle 606. Additionally, the proximate vehicle 608 may be wholly or partially ahead of or behind the host vehicle 606 or laterally aligned with the host vehicle 606. The host vehicle 606 may have a number of sensors, such as a forward sensor 214 and corner sensors 216a-216d, as described with respect to FIG. 2.

The roadway 600 may also include remote sensors such as remote sensor 610. The remote sensor 610 may include a number of remote sensors, for example, the remote sensor 610 may include a camera 612 and a transceiver 614 that enables the remote sensor 610 to send and receive data, such as the sensor data. The remote sensor 610 may also be an in pavement sensor, smart pavement sensor, or network of sensors. The host vehicle 606 may estimate the LOV based on sensor data received from the remote sensor 610. For example, the host vehicle 606 may use sensor data from the remote sensor 610, to monitor the actual progress of the proximate vehicle 608, represented as observed proximate vehicle 616, and predict the progress of the proximate vehicle 608, represented as predicted proximate vehicle 618 along the predicted path 620. The sensor data may be images received from the camera 612 of the remote sensor 610. For example, the predicted path 620 may be calculated based on the width of the second lane 604. Therefore, the predicted path 602 can be estimated even if the vehicle sensors 134 of the host vehicle 606 are unable to directly sense the proximate vehicle 608 because the proximate vehicle 608 is still in sensor range of the host vehicle 606 by virtue of the remote sensor 610.

Figure 5B:
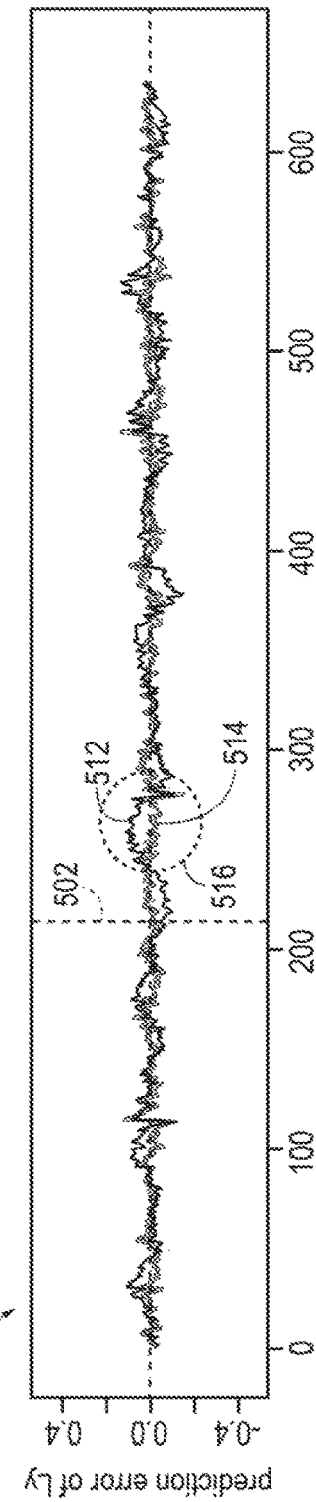
FIG. 5B is an example lane offset error baseline in time for a distracted driver according to an exemplary embodiment.

Returning to FIG. 4, at block 406, an LOE baseline may also be predicted based on one or more motion models, proximate vehicle data, as well as roadway data about the roadway 200. An example graphical representation of an LOE baseline 510 is shown in FIG. 5B. In particular, the LOE baseline 510 includes prediction errors in time. The prediction errors may be measured as a percentage deviation. Furthermore, the time on the x-axis may be measured in milliseconds, and includes the reference time 502 corresponding to the reference time 502 shown in the LOV baseline 500. The LOE baseline 510 includes a CA LOE prediction 512 corresponding to the CA motion model and the CTRA LOE prediction 514 corresponding to the CTRA motion model, with error variance being calculated in the manner described above.

At block 408, the current kinematic data for the proximate vehicle 208 represented by the observed proximate vehicle 210 is compared to one or more of the baselines. For example, returning to FIG. 5A, the current kinematic data from the proximate vehicle data may be compared to the LOV baseline 500. For example, the current kinematic data may include a measurement of how the observed proximate vehicle 210 deviated from the predicted path. The current kinematic data regarding the offset of the observed proximate vehicle 210 may be measured by the vehicle sensors 134 of the host vehicle 202 or communicated to the host vehicle 202 from proximate vehicles and/or roadside sensing equipment. In some embodiments, the comparison may be made incrementally. For example, the comparison may compare a baseline to the current kinematic data in increments, such as one second increments or continually be comparing the baseline to the current kinematic data. Therefore, by comparing the current kinematic data to the LOE baseline, it can be determined if one or more of the models used to generate the baseline predicted the progression of the proximate vehicle 208.

Likewise, the current kinematic data from the proximate vehicle data may be compared to the LOE baseline 510 of FIG. 5B. The CA LOE prediction 512 and the CTRA LOE prediction 514 predict the error of the motion model with respect to the actual behavior exhibited by the proximate vehicle 208 as it traversed the roadway 200. For example, at the reference time 502, the CA LOE prediction 512 and the CTRA LOE prediction 514 both have relatively low error, and therefore both modeled the behavior of the proximate vehicle 208 with relatively high accuracy to other segments of the LOE baseline 510.

In LOE baseline segment 516, the CTRA LOE prediction 514 has less error than the CA LOE prediction 512. Accordingly, the CTRA LOE prediction 514 is a better predictor of the behavior of the proximate vehicle 208 than the CA LOE prediction 512. Therefore, even though the proximate vehicle 208 is not behaving in a manner consistent with the CA LOE prediction 512, the proximate vehicle 208 is behaving in a manner consistent with the CTRA LOE prediction 514. Because different motion models make predictions based on different assumption of driving style (e.g., constant speed, accelerating, driving on a straight away, driving around a curve, etc.), the LOE baseline 510 may incorporate multiple motion models. Then as the proximate vehicle 208 changes driving style, such as entering a curve after driving on a straight away, at least one of the models may still predict the behavior of the proximate vehicle 208. The comparison is made to determine if at least one motion model was able to predict the behavior of the proximate vehicle 208 within a prediction threshold.

At block 410, the method 400 includes generating distraction flags based on the comparison. In one embodiment, a distraction flag may be generated if a predetermined number of motion models did not predict the proximate vehicle data. For example, a distraction flag may be generated if none of the motion models predicted the actual behavior of the observed proximate vehicle 210. In some embodiments, a control chart may then be used to determine if one or more of the motion models of the baseline was able to predict the behavior of the observed proximate vehicle 210 by comparing the current kinematic data to the baseline. The control charts may be based on academic papers, domain knowledge, vendors, calculated values, and cruise control data, among others.

Figure 5C:
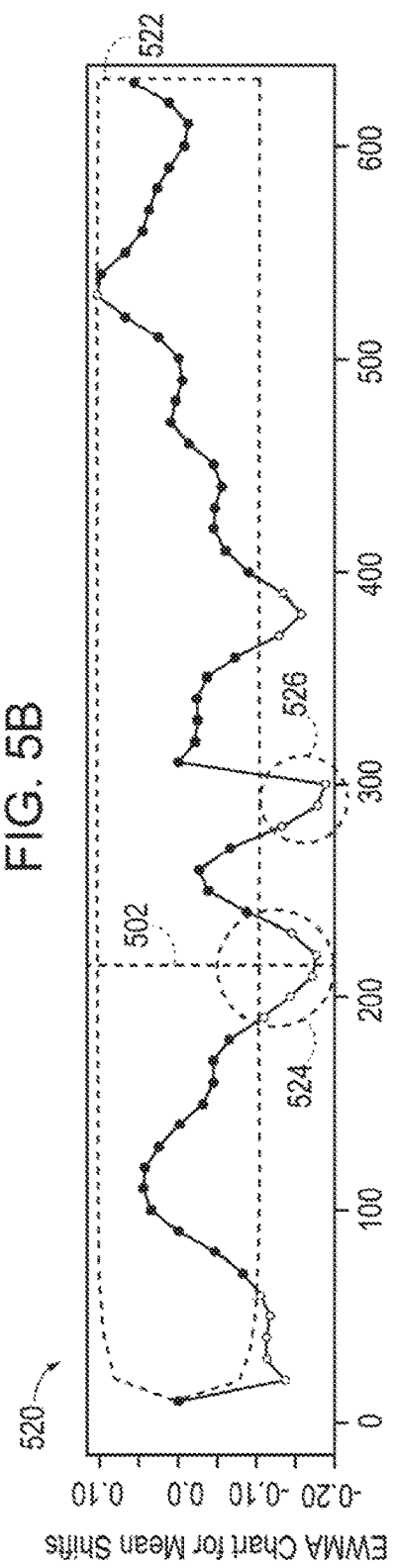
FIG. 5C is an example of an exponentially weighted moving average (EWMA) control chart for identifying at least one offset flag, according to an exemplary embodiment.

An example of an exponentially weighted moving average (EWMA) control chart 520 corresponding to the LOV baseline 500 is illustrated in FIG. 5C. The EWMA control chart 520 illustrates a mean offset shift based on the motion models used estimate the LOV baseline 500. In this example, the LOV baseline 500 corresponding to the EWMA control chart 520 has 10 increments.

$X_i$: lane offset signal $Z_0 = \bar{X}_{1n}, n = 10$ $Z_i = \lambda \bar{X}_{(n-1)i+1:ni} + (1-\lambda)Z_{i-1}$ $\lambda = 0.2, L = 3$ $CL_i = 0$ $UCL_i = L\sigma\sqrt{\frac{\lambda}{2-\lambda}[1-(1-\lambda)^{2i}]}$ $LCL_i = -L\sigma\sqrt{\frac{\lambda}{2-\lambda}[1-(1-\lambda)^{2i}]}$ The EWMA control chart 520 plots the predicted kinematic data of the LOV baseline 500. For example, a mean shift area 522 include the values of offset predicted by the CA LOV prediction 504 and the CTRA LOV prediction 506 as well as any values in between. Returning to the LOV baseline 500 of FIG. 5A, at the reference time 502, both the CA LOV prediction 504 and the CTRA LOV prediction 506 predict that the proximate vehicle 208 will have some negative offset from the predicted path.

A distraction flag may be generated when the proximate vehicle data exceeds the mean shift area 522 indicating that the current kinematic data did not conform to the LOV baseline 500. Suppose that the proximate vehicle 208 laterally moved corresponding to a positive offset from the predicted path at the reference time 502. The first EWMA segment 524, corresponds to the proximate vehicle 208 laterally moving corresponding to a positive offset from the predicted path rather than the predicted negative offset of the motion models. Accordingly, each of the increments in the first EWMA segment 524 correspond to an increment of time in which neither the CA LOV prediction 504 nor the CTRA LOV prediction 506 predicted the current kinematic data for the negative offset. Accordingly, in some embodiments, a distraction flag, such as an offset flag may be generated for each of the increments in the first EWMA segment 524. Similarly, the second EWMA segment 526 includes increments in which the CA LOV prediction 504 and the CTRA LOV prediction 506 do not accurately predict the current kinematic data.

Figure 5D:
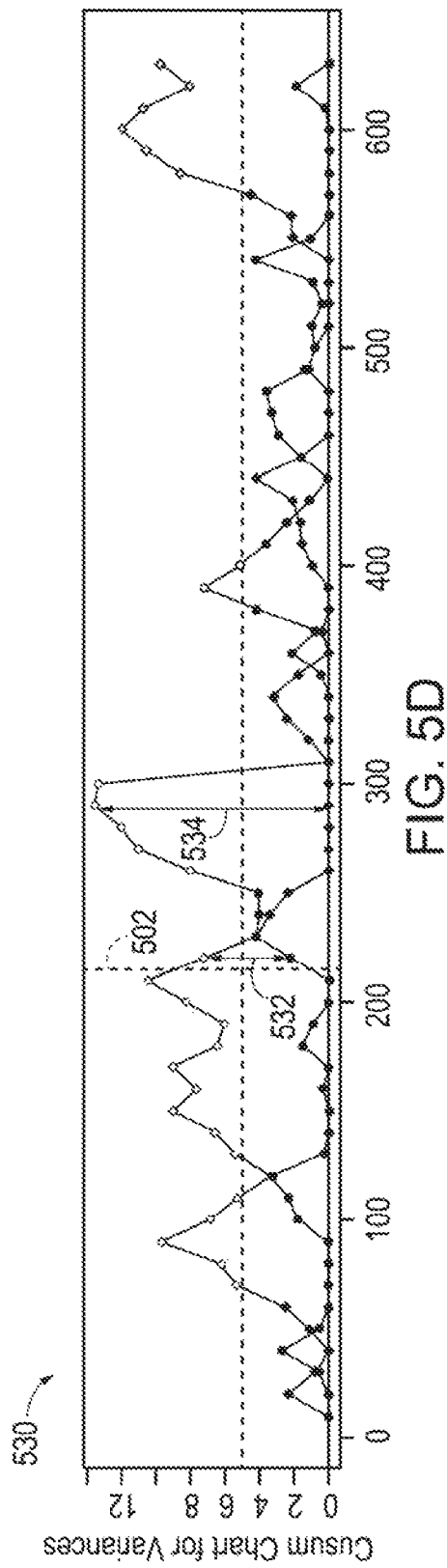
FIG. 5D is a cumulative sum (CUSUM) control chart for identifying at least one variance flag according to an exemplary embodiment.

Another example of a control chart is a cumulative sum (CUSUM) control chart 530 shown in FIG. 5D. In one example embodiment, to calculate the variance for the CUSUM control chart, the window size may be set as 10. Furthermore, according to one example, it may be set such that k=0.5.

The monitoring statistics may be calculated as below:

$v_i = \dfrac{\sqrt{|(\bar{Y}_i - \mu_0)/\sigma|} - 0.822}{0.349} \sim N(0, 1)$ $\bar{v}_i = \dfrac{1}{\sqrt{10}}\sum_{t=i+1}^{i+10} v_t \sim N(0, 1)$ $S_i^+ = \max\{0, \bar{v}_i - k + S_{i-1}^+\}$ $S_i^- = \max\{0, -\bar{v}_i - k + S_{i-1}^-\}$ A distraction flag may be generated when the proximate vehicle data indicates unstable variations. For example, a variation threshold may be set based on an acceptable amount of variation. In one embodiment, the variation threshold may be a value denoting a number of variations. In another embodiment, the variation threshold may be a maximum deviation of the current kinematic data from the predicted values of the CUSUM control chart. For example, the variation threshold may be a difference of 6 or less. Therefore, the first variation 532 may be acceptable, however a second variation 534 exceeds the variation threshold. Accordingly, when the variations exceed the variation threshold a distraction flag, such as a variation flag, is generated.

Figure 5E:
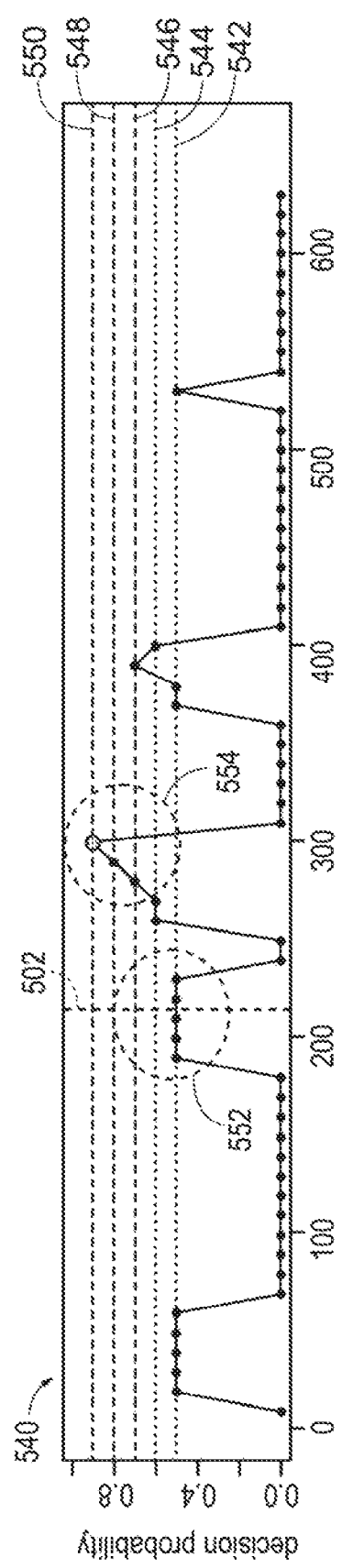
FIG. 5E is an example decision chart measured in time for a distracted driver according to an exemplary embodiment.

Returning to FIG. 4, at block 412, the method 400 includes calculating a distraction probability based on the generated distraction flags. Because there is more than one type of distraction flag (e.g., offset flag, variation flag, etc.), the distraction flags may be combined. In one embodiment, the distraction flags are combined in a decision chart. FIG. 5E is an example decision chart 540 in time. The decision chart 540 is a graphical representation of the likelihood that the proximate vehicle 208 is exhibiting distracted behavior. Accordingly, the information from the EWMA control chart 520 and the CUSUM control chart 530 are combined in the decision chart 540.

In some embodiments, a robust measure of distraction may be desired before the controlling the vehicle systems 122 to make changes to the operation of the host vehicle 202. Accordingly, the distraction determination may be based on a distraction probability using a time window. A time window is detected whenever the value $Z_i$ is smaller than $LCL_i$ or it is greater than $UCL_i$. According to the CUSUM control chart method, a time window is detected whenever the value $S_i^1$ is greater than the threshold H=5. The CUSUM chart detects a time window when the driving style is not predicted by the motion models. For example, returning to the LOE baseline 510 of FIG. 5B, at the reference time 502, both the CA LOV prediction 504 and the CTRA LOV prediction 506 predict that the proximate vehicle 208 will have some negative offset from the predicted path. However, suppose that the proximate vehicle laterally moved corresponding to a positive offset from the predicted path at the reference time 502. This deviation from the baselines is represented in the EWMA control chart 520 at the reference time 502 by the first EWMA segment 524. The first EWMA segment 524 corresponds to first distraction area 552 of the decision chart 540. Accordingly, the distraction flags associated with the one or more baselines are used to calculate the distraction probability.

The distraction probabilities of the first distraction area 552 may be set according to decision rules. The decision rules indicate the distraction probability according to distraction levels. For example, an offset flag alone may indicate a 50% distraction probability 542, a variance flag alone may indicate a 60% distraction probability 544, and both may indicate a 70% distraction probability 546. In some embodiments, the distraction probabilities are monitored in a five second window that shifts by one second. The distraction probability increases when there are multiple distraction flags generated in the 5 second window. Suppose that at 2-seconds both an offset flag and a variance flag are generated, then the distraction probability may be 80% distraction probability 548, and at 3-second both an offset flag and a variance flag are generated, then the distraction probability is 90% distraction probability 550.

To avoid the a distraction determination being generated multiple times over a short period of time, the distraction probability may be reset to zero in the next time window if a distraction flag is triggered. The determination module 118 may continue to monitor the proximate vehicle 208 for distracted behavior after a predetermined amount of time elapses. Furthermore, by calculating the distraction probability, false positives can be filtered out of the distraction determination. For example, a false distraction flag may be generated if the EWMA control chart 520 is used and the proximate vehicle 208 is driving along one of the edges of lane 204. In another example a false distraction flag may be generated if the CUSUM control chart 530 is used and the proximate vehicle 208 is waving around the centerline 206 of the lane 204.

In some embodiments, a distraction flag may not be generated. For example, a distraction flag may not be generated in a lane change scenario. Therefore, when lane change behaviors give rise to non-continuous lane offset signal patterns in the proximate vehicle data. Accordingly, the distraction flag may not be generated with a lane change behavior is detected. Distraction flags may also not be generated in curve driving scenario. For example, if a motion model is unable to track the proximate vehicle 208 around a curve, the distraction flag may not be generated if a baseline has not been generated for the proximate vehicle 208 during a window of time.

Furthermore, the estimation module 116 may only estimate a baseline for roadways having a maximum lane radius or less. For example, a maximum lane radius may be 0.00015 meter. Likewise, the estimation module 116 may only estimate a baseline when sensor data from the vehicle systems 122 and/or the vehicle sensors 134. For example, if the vehicle sensors 134 are unable to capture sensor data regarding lane lines. When the estimation module 116 is unable to satisfy a baseline for a window of time, the distraction flags may not be generated for that window of time.

At block 414, the method 400 includes controlling one or more vehicle systems 122 of the host vehicle 202 based on the distraction probability. As discussed above, the vehicle systems 122 of the host vehicle 202 may be altered to specifically address the distraction probability. For example, suppose that distraction probability is 50%, the control module 120 may cause an autonomous cruise control system of the vehicle systems 122 to apply a brake. Conversely, a distraction probability of 80% distraction probability 548 or higher, may cause the control module 120 to initiate a lane change maneuver. For example, the first distraction area 552 of the decision chart 540 may not trigger the control module 120 alter the one or more vehicle systems 122, but a second distraction area 554 may trigger the control module 120 alter the one or more vehicle systems 122.

Thus, the control module 120 can control the host vehicle 202 based on the level of the distraction flags denoted by the distraction probability. Thus, the distraction probability may be compared to a probability threshold to determine if distraction behavior exhibited by the proximate vehicle 208 constitutes the control module 120 changing the operation of the host vehicle 202. For example, the one or more vehicle systems may be controlled based on the distraction flags when the probability threshold is satisfied. In another embodiment, the control module 120 may have a tiered response to a distraction determination that is based on the distraction probability.

Additionally or alternatively, an alert may be issued to the vehicle occupant of the host vehicle 202. Therefore, one or more of the vehicle systems 122 may be controlled to alert a vehicle occupant of the host vehicle 202 and/or to accommodate the driving style of the proximate vehicle 208. In this manner, the host vehicle 202 can facilitate identification of distracted driving behavior exhibited by a proximate vehicle 208. Furthermore, the distraction determination is based on the behavior of the proximate vehicle 208 and does not depend on visualizing the driver of the proximate vehicle 208. Moreover, the distraction determination can be made regardless of the type of distraction. Accordingly, the vehicle occupant of the host vehicle 202 or the host vehicle 202 autonomously can make changes to the operation of the host vehicle 202 based on the distraction determination.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for a host vehicle to detect driving distraction, comprising:
   receiving proximate vehicle data about a proximate vehicle proximate to the host vehicle;
   estimating one or more baselines for a predetermined future time for the proximate vehicle from the proximate vehicle data;
   comparing current kinematic data of the proximate vehicle data for the predetermined future time to the one or more baselines;
   generating one or more distraction flags associated with the proximate vehicle based on the comparison, wherein a distraction flag, of the one or more distraction flags, is associated with a type of distraction flag, and wherein there are a plurality of types of distraction flag including an offset flag based on a position of the proximate vehicle and a variance flag based on a predicted position of the proximate vehicle and the position of the proximate vehicle at the predetermined future time;
   calculating a distraction probability based on the one or more distraction flags; and
   controlling one or more vehicle systems of the host vehicle based on the distraction flags in response to the distraction probability satisfying a probability threshold.

2. The computer-implemented method of claim 1, wherein estimating the one or more baselines includes applying the proximate vehicle data to a motion model to predict behavior of the proximate vehicle.

3. The computer-implemented method of claim 2, wherein the proximate vehicle data is applied to the motion model using a model fitting method.

4. The computer-implemented method of claim 1, wherein a distraction flag is identified when the current kinematic data exceeds the one or more baselines by a distraction threshold.

5. The computer-implemented method of claim 4, wherein the offset flag is based on a distance measurement, the current kinematic data is a position measurement, and the baseline includes a lane offset value.

6. The computer-implemented method of claim 4, wherein the one or more vehicle systems are controlled to change operation of the host vehicle associated with the current kinematic data to satisfy the distraction threshold.

7. The computer-implemented method of claim 1, wherein the one or more baselines include a Lane Offset Value (LOV) baseline that predicts a path of the proximate vehicle in a lane.

8. The computer-implemented method of claim 7, wherein the current kinematic data includes a distance measurement between an observed proximate vehicle and the predicted path.

9. The computer-implemented method of claim 1, wherein the one or more baselines include a Lane Offset Error (LOE) baseline that predicts variance in predicted behavior of the proximate vehicle, and wherein the variance flag is based on the LOE error.

10. A system for distracted driving detection, comprising:
a processor;
a data receiving module, implemented via the processor, configured to receive proximate vehicle data about a proximate vehicle proximate to a host vehicle;
an estimation module, implemented via the processor, configured to estimate one or more baselines for a predetermined future time for the proximate vehicle from the proximate vehicle data;
a determination module, implemented via the processor, configured to:
generate one or more distraction flags for the proximate vehicle based on current kinematic data about the proximate vehicle at the predetermined future time and the one or more baselines, wherein a distraction flag, of the one or more distraction flags, is associated with a type of distraction flag, and wherein there are a plurality of types of distraction flag including an offset flag based on a position of the proximate vehicle and a variance flag based on a predicted position of the proximate vehicle and the position of the proximate vehicle at the predetermined future time, and
calculate a distraction probability based on the one or more distraction flags; and
a control module, implemented via the processor, configured to control one or more vehicle systems of the host vehicle based on the identified distraction flags in response to the distraction probability satisfying a probability threshold.

11. The system of claim 10, wherein estimating the one or more baselines includes applying the proximate vehicle data to a motion model to predict behavior of the proximate vehicle.

12. The system of claim 11, wherein the proximate vehicle data is applied to the motion model using a model fitting method.

13. The system of claim 10, wherein a distraction flag is identified when the current kinematic data exceeds the one or more baselines by a distraction threshold.

14. The system of claim 13, wherein the offset flag is based on a distance measurement, the current kinematic data is a position measurement, and the baseline includes a lane offset value.

15. A non-transitory computer-readable storage medium storing instructions that, when executed by a computer, causes the computer to perform a method comprising:
receiving proximate vehicle data about a proximate vehicle proximate to a host vehicle;
estimating a Lane Offset Value (LOV) baseline that predicts a path of the proximate vehicle in a lane;
estimating a Lane Offset Error (LOE) baseline that predicts variance in predicted behavior of the proximate vehicle;
comparing current kinematic data of the proximate vehicle data to the LOV baseline and the LOE baseline;
generating one or more distraction flags associated with the proximate vehicle based on the comparison, wherein a distraction flag, of the one or more distraction flags, is associated with a type of distraction flag, and wherein there are a plurality of types of distraction flag including an offset flag based on a position of the proximate vehicle relative to the LOV baseline and a variance flag based on a predicted position of the proximate vehicle and the position of the proximate vehicle at the predetermined future time based on the LOE baseline;
calculating a distraction probability based on the distraction flags; and
controlling one or more vehicle systems of the host vehicle based on the distraction probability in response to the distraction probability satisfying a probability threshold.

16. The non-transitory computer-readable storage medium of claim 15, wherein the LOV baseline or the LOE baseline is estimated using a motion model.

17. The non-transitory computer-readable storage medium of claim 16, wherein the motion model is one of a constant velocity model, constant acceleration model, constant steering angle and velocity model, constant turn rate and velocity model, constant turn rate and acceleration model, and a constant curvature and acceleration model.

\* \* \* \* \*